United States Patent Office 2,821,855
Patented Feb. 4, 1958

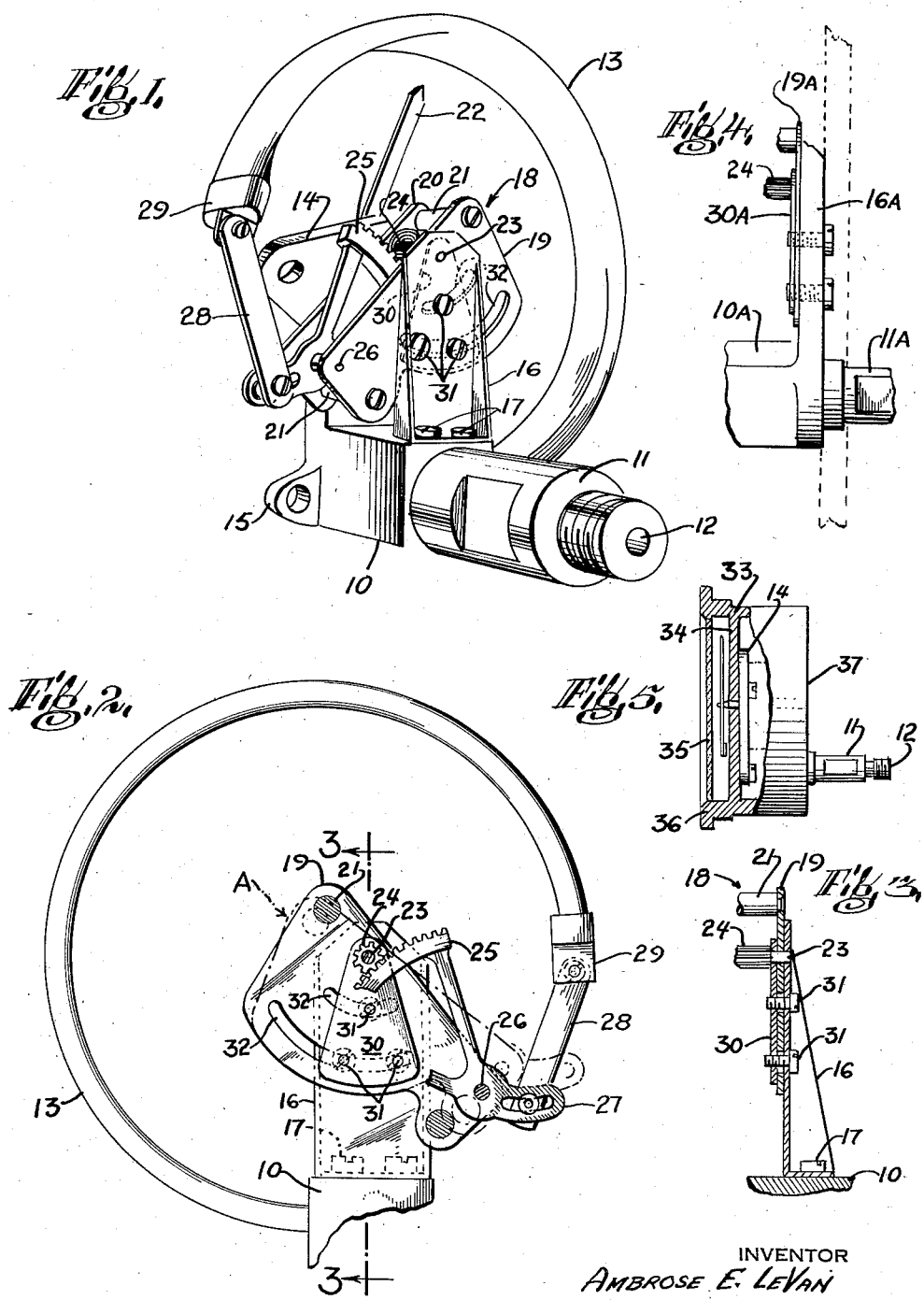

2,821,855
PRESSURE GAUGE

Ambrose E. Le Van, Sellersville, Pa., assignor to American Machine and Metals, Inc., New York, N. Y., a corporation of Delaware Application May 25, 1955, Serial No. 510,985

6 Claims. (Cl. 73—411)

This invention relates to dial instruments such as pressure gauges or the like, and particularly to the means for adjusting the movement thereof for calibrating and setting purposes.

In prior instruments, the parts in many instances have been supported in such a manner that any strain on the pipe connections to the instrument will cause twisting of the various elements relative to each other and thus cause inaccurate readings. Prior devices also have been difficult to set and to clamp the parts in their set position.

One of the objects of the invention is to provide an improved manner of supporting the movement of a dial instrument.

A further object of the invention is to provide an arrangement wherein the effect of external strains on the gauge will be minimized.

In one aspect of the invention, the case may have a partition contiguous to the front thereof for carrying the dial, the front portion of the Bourdon tube socket being fastened to said partition, the Bourdon tube or spring being mounted on the socket in the usual manner. The pipe for connecting pressure or fluid to the spring extends downwardly or rearwardly from said socket. In one form, the spring socket has a bracket extending upwardly at the rear thereof, said mounting bracket being integrally formed with the socket or being a separate bracket fastened thereto. The movement or means to transmit motion of the Bourdon spring or other device to a pointer may include a pair of spaced plates, the plates carrying the pointer or indicator shaft, said shaft having a portion extending rearwardly into the mounting bracket and extending forwardly independent of and freely through the partition and dial. The plates also carry a pivot shaft for the segment which engages the usual pinion on the pointer shaft for amplifying movement of the spring, the other end of the segment having a connection to the Bourdon spring. If a twisting force or strain is exerted on the pipe connection to the socket, the movement and its shaft can move independently of the dial.

In a preferred form, which can be used with the construction first mentioned or can be used with a construction wherein the dial is mounted directly on the socket, a clamping plate is arranged to be removably fastened to said supporting bracket with one of the side plates of the movement being held between the clamping plate and the supporting bracket. Preferably, screw-threaded means extend between the clamping plate and bracket for holding the parts in clamped relationship. Said side plate between the bracket and clamp of the movement is pivotally mounted about axis of the pointer, there being suitable arcuate shaped apertures in said side plate through which the screw-threaded means pass. Said apertures will permit the movement to be rotated about the pointer and adjusted when the screw-threaded means are loosened. Preferably, three screw-threaded means are provided, the heads thereof having slots or turning portions which face the rear of the instrument case. Thus, the clamping surfaces are relatively wide so as to facilitate holding of the parts. Also, it is preferable that the screws be located within a sector not more than 180° in extent, such assisting in holding the parts in their set position as the clamping screws are tightened.

These and other objects, advantages and features of the invention will become apparent from the following descriptions and drawings which are merely exemplary.

In the drawings:

Fig. 1 is a perspective view from the rear of one form of the invention.

Fig. 2 is a fragmentary view looking from the front of Fig. 1.

Fig. 3 is a fragmentary section taken along the line 3—3 of Fig. 2.

Fig. 4 is a fragmentary view showing an alternative form of bracket.

Fig. 5 is a reduced view, partially in section, showing one form of case with which the invention may be used.

Referring to Fig. 1, Bourdon tube socket 10 may have a connecting pipe or means 11 extending rearwardly therefrom, said connecting pipe having an aperture 12 for admitting pressure to the interior of Bourdon spring 13. Bourdon spring 13 has its end mounted on the spring socket in the usual manner.

Socket 10 may have an upstanding portion 14 at the front thereof and ear means 15 to which the front partition of the instrument casing can be fastened, as illustrated in Fig. 5.

Bracket 16 can be fastened to spring socket 10 at its rear portion by means of suitable screws 17, 17, these being located adjacent to connecting means 11.

Gauge movement 18 may comprise a pair of side plates 19, 20 held in spaced relation by means of spacer posts 21, 21. Pointer 22 is mounted on pointer shaft 23, said shaft being pivotally mounted in side plates 19, 20 and having a portion extending into an aperture in bracket 16. Pointer shaft 23 has pinion 24 engageable by segment 25, segment 25 being mounted on shaft 26 between side plates 19, 20. Tail portion 27 of segment 25 may be adjustably connected by link 28 to tip 29 of Bourdon spring 13.

In order to adjustably hold the movement assembly 18 in place, clamping plate 30 (Fig. 2, Fig. 3) may be mounted on shaft 23, said clamping plate being screw-threadedly engaged by clamping means or screws 31. The clamping screws 31 pass through arcuate slots 32 appropriately located in side plate 19. Preferably, the screws are not more than 180° apart or in a sector not greater than 180° so that when being tightened, there will not be a tendency to turn the assembly.

If it is desired to rotate movement assembly 18 for adjusting or calibrating purposes, such can be accomplished by loosening clamping screws 31 and then turning the assembly, for example, from the full line position seen in Fig. 2 to the dot-dash line position. The clamping screws then can be tightened so as to firmly clamp the parts in place.

By having the movement plate clamped between the clamping plate and bracket 16, turning of the screws will not affect the arrangement inasmuch as they pass through enlarged apertures or holes in the plate and the screw head is not in contact with side plate 19. When the heads of the screws are in contact therewith, turning of the screw will tend to move the same.

As an example of one use of the invention, gauge casing or housing 33 (Fig. 5) may have a solid front partition 34 upon which a suitably engraved dial is fastened and window 35 can be carried on the front face 36 of casing 33. Plate 14 (Figs. 1, 5) can be appropriately fastened to partition 34. An appropriate back cover insert (not shown) can be placed in the opening in the back 37 of casing 33. When it is desired to adjust the movement, it is merely necessary to remove the back plate, unloosen the clamping screws, and turn the movement. The clamping screws then can be retightened.

It also is possible to form the bracket carrying the movement integrally with the socket as illustrated in Fig. 4. Socket 10A has bracket 16A integrally mounted thereon, movement side plate 19A being carried between bracket 16A and clamping plate 30A. Connecting pipe 11A extends from the rear of the spring socket 10A and the dial plate can be directly mounted on the front end of the socket 10A.

The clamping plate arrangement described also can be used to advantage in conjunction with a gauge having the dial fastened to the front of the socket. This and other details of construction can be varied without departing from the spirit of the invention except as defined in the appended claims.

What is claimed is:

1. In a pressure gauge, the combination including a case, a socket in said case, said socket having connection means extending to the exterior of said case, a Bourdon spring mounted on said socket and within said case, dial means located frontwardly of said socket, a movement supporting bracket directly on said socket and at the rear thereof adjacent said connection means, movement means adjustably mounted on said bracket, said movement means including a pair of spaced side plates with a pointer shaft journalled therein and operating means connecting said Bourdon spring and shaft, one of said side plates having arcuately extending slots therein, and clamping plate means having a face area which covers a substantial portion of said side plate clampably mounted on said bracket for carrying one of said spaced side plates between said bracket and said clamping plate.

2. In a pressure gauge, the combination including a case, a socket in said case, said socket having connection means extending to the exterior of said case, a Bourdon spring mounted on said socket and within said case, dial means located frontwardly relative to said socket, a movement supporting bracket directly on said socket and at the rear thereof adjacent said connection means, movement means adjustably mounted on said bracket, said movement means including a pair of spaced side plates with a pointer shaft journalled therein and operating means connecting said Bourdon spring and shaft, one of said side plates having arcuately extending slots therein, and clamping plate means having a face area which covers a substantial portion of said side plate and having screw-threaded means extending to said bracket and through said slots in said side plate, said movement being adjustably rotatable relative to both the clamping plate means and the bracket about said shaft when said screw-threaded means are loosened.

3. In a pressure gauge, the combination including a case, a socket in said case, said socket having connection means extending to the exterior of said case, a Bourdon spring mounted on said socket and within said case, dial means adjacent the front of said socket, a movement supporting bracket directly on said socket and the rear thereof and adjacent said connection means, movement means adjustably mounted on said bracket, said movement means including a pair of spaced side plates with a pointer shaft journalled therein and operating means connecting said Bourdon spring and shaft, one of said side plates having arcuately extending slots therein, and a clamping plate having a face area which covers a substantial portion of said side plate and having screw-threaded means extending to said bracket and through said slots in said side plate, said movement being adjustably rotatable relative to both the clamping plate and the bracket about said shaft when said screw-threaded means are loosened, said screw-threaded means being located not more than 180° apart.

4. In a pressure gauge, the combination including a case having a front partition with a shaft receiving aperture therein, a socket in said case fastened at its front end to said partition, said socket having connection means extending rearwardly to the exterior of said case, a Bourdon spring mounted on said socket and within said case, dial means on said partition, a movement supporting bracket directly on said socket and at the rear thereof adjacent said connection means, and movement means adjustably mounted on said bracket, said movement means including a pointer shaft journalled therein and operating means connecting said Bourdon spring and shaft, one of said side plates having arcuately extending slots therein, said shaft extending through said aperture in said partition and being freely moveable therein.

5. In a pressure gauge, the combination including a case having a front partition with a shaft receiving aperture therein, a socket in said case fastened at its front end to said partition, said socket having connection means extending rearwardly to the exterior of said case, a Bourdon spring mounted on said socket and within said case, dial means on said partition, a movement supporting bracket directly on said socket and at the rear thereof adjacent said connection means, movement means adjustably mounted on said bracket, said movement means including a pointer shaft journalled therein and operating means connecting said Bourdon spring and shaft, one of said side plates having arcuately extending slots therein, said shaft extending through said aperture in said partition and being freely moveable therein, and a clamping plate means having a face area which cover a substantial portion of said side plate and having screw-threaded means extending to said bracket and through said slots in said side plate, said movement being adjustably rotatable relative to both the clamping plate means and the bracket about said shaft when said screw-threaded means are loosened.

6. In a gauge, the combination including a case, a socket in said case, said socket having connection means extending to the exterior of said case, a Bourdon spring mounted on said socket and within said case, a movement supporting bracket directly on said socket, movement means adjustably mounted on said bracket, said movement means including at least one side plate with a pointer shaft journalled therein and operating means connecting said Bourdon spring and shaft, said side plate having arcuately extending slot means therein, and a clamping plate having a face area which covers a substantial portion of said side plate and having screw-threaded means extending to said bracket and through said slot means in said side plate, said movement being adjustably rotatable relative to both the clamping plate and the bracket about said shaft when said screw-threaded means are loosened.

References Cited in the file of this patent

UNITED STATES PATENTS

| 940,379 | Blanchard et al. | Nov. 16, 1909 |

FOREIGN PATENTS

| 591,684 | Great Britain | Aug. 26, 1947 |
| 618,119 | Great Britain | Feb. 16, 1949 |
| 629,369 | Great Britain | Sept. 19, 1949 |